US006602569B2

(12) United States Patent
Yamashita et al.

(10) Patent No.: US 6,602,569 B2
(45) Date of Patent: Aug. 5, 2003

(54) PRODUCTION PROCESS FOR RING SHAPED RESIN BONDED MAGNET

(75) Inventors: Fumitoshi Yamashita, Ikoma (JP); Hiroshi Ueda, Nishinomiya (JP); Sunao Hashimoto, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/072,983

(22) Filed: Feb. 12, 2002

(65) Prior Publication Data

US 2002/0145220 A1 Oct. 10, 2002

Related U.S. Application Data

(62) Division of application No. 09/424,565, filed as application No. PCT/JP98/02371 on May 29, 1998, now Pat. No. 6,365,078.

(30) Foreign Application Priority Data

May 30, 1997 (JP) .......................................... 09-141948

(51) Int. Cl.[7] .................................................. B32B 3/00
(52) U.S. Cl. ...................................... 428/64.1; 428/66.6
(58) Field of Search .............................. 428/66.6, 64.1; 264/DIG. 58

(56) References Cited

U.S. PATENT DOCUMENTS

| | | | |
|---|---|---|---|
| 5,100,604 A | 3/1992 | Yamashita et al. .......... | 264/115 |
| 5,149,477 A | 9/1992 | Yamashita et al. | |
| 5,221,503 A | 6/1993 | Ward et al. | |

FOREIGN PATENT DOCUMENTS

| | | |
|---|---|---|
| EP | 0 540 503 | 5/1993 |
| JP | 57-31109 | 2/1982 |
| JP | 63-194312 | 8/1988 |

OTHER PUBLICATIONS

Patent Abstracts of Japan, vol. 010, No. 082, Apr. 2, 1986 & JP 60 227408 A (Suwa Seikosha KK), Nov. 12, 1985.
Patent Abstracts of Japan, vol. 010, No. 035, Feb. 12, 1986 & JP 60 194509 A (Asahi Kasei Kogyo KK), Oct. 3, 1985.

*Primary Examiner*—Alexander S. Thomas
(74) *Attorney, Agent, or Firm*—Wenderoth, Lind & Ponack, L.L.P.

(57) ABSTRACT

There is provided a process of producing a ring shaped resin bonded magnetic member by molding a feed mixture 24 which contains a lubricant and a magnetic powder composite made of magnetic powder and a heat curable resin composition which is in a solid state at a room temperature. The process is characterized in that (1) heating an inner peripheral surface of the annular cavity 20 so as to transfer heat to the feed mixture 24 whereby heating the feed mixture to a temperature not lower than a softening temperature and below a curing temperature of the resin composition, and compressing the filled feed mixture after or during the heating; and (ii) cooling the inner peripheral surface so as to transfer heat from the heated and compressed feed mixture through the inner peripheral surface, whereby cooling the feed mixture to a temperature below the softening temperature of the resin composition so as to obtain a green compact having a ring shape.

15 Claims, 5 Drawing Sheets

PRODUCTION PROCESS FOR RING SHAPED RESIN BONDED MAGNET

CROSS-REFERENCE TO RELATED APPLICATION

This application is a divisional of Ser. No. 09/424,565 filed Nov. 24, 1999, U.S. Pat. No. 6365078 which is a 371 of PCT/JP98/02371 filed May 29, 1998.

The disclosure herein relates to subject matters contained in Japanese Patent Application No. 9-141948 filed on May 30, 1997, based on which a benefit of the priority of the Paris Convention is claimed in the present application, and thus the entirety of the Japanese Patent Application is expressly incorporated herein.

TECHNICAL FIELD

The present invention relates to a process of producing a thin ring shaped resin bonded magnetic member based on for example Fe—B—R (wherein R is Nd and/or Pr) magnetic powder in which member the magnetic powder is densely filled, and also to such a magnetic member which is produced by the process. The member has a wall thickness of for example not greater than 1 mm. The magnetic member may be used in a disc driving motor installed in a personal computer which motor is required to be compact and to produce a larger power and/or to consume less electric power.

The present process uses a molding apparatus which is applicable to continuous (or successive) compression molding of a resin bonded magnetic member and which mechanically or hydraulically applies a pressure, and the process comprises the following basic steps of mold filling, compressing and mold releasing.

BACKGROUND ART

Magnet has been developed in a resin bonded magnet and a sintered magnet separately under the consideration of their performances and production costs with respect to their forms when they are used. In general, in order to ensure the priority of an Fe—B—R based resin bonded magnet in its practical application, it is advantageous that such magnet is intended to be formed into a thin ring shape which is difficult for the sintered magnet to be formed into. Magnetic characteristics of an Fe—B—R based resin bonded magnetic member depend on an overall density of the member and also the magnet itself which constitutes the member. Thus, it is required to increase the density as much as possible with considering the production cost of the member.

In the molding production of the thin (for example a thickness of less than 1 mm) ring shaped resin bonded magnetic member based on Fe—B—R magnetic powder as described above, it is generally difficult to uniformly fill the magnetic powder in a mold cavity, to densely compress the powder, or to ensure good dimensional accuracy of a green compact. Further, it is also difficult to, in a readily usable form as a magnetic member, ensure a precise size of the member and to make the member present characteristics of the magnetic powder itself.

Hitherto, magnetic powder which contains an epoxy resin composition (about 1–6% by weight) has been used for the production of a ring bonded magnetic member based on Fe—B—R or Sm—Co.

For example, anisotropic magnetic powder is used together with an epoxy resin composition which is in a liquid state at a room temperature for the production of the resin bonded Fe—B—R or Sm—Co based magnetic member. However, such an epoxy resin composition adversely affects on fluidity (or free-flowability) of the magnetic powder, so that it is difficult to uniformly, fill a mold cavity with its fluidity. Further, it is not easy to handle a green compact during mold releasing and curing of the resin composition thereafter because of less mechanical strength of the green compact. Thus, it is difficult to ensure and keep good dimensional accuracy of the magnetic member as a final product.

In order to overcome the above problem, Japanese Patent Kokai Publication No. 60-194,509 discloses a process in which magnetic powder is coated with an epoxy resin composition which is in a solid state at a room temperature, and provided with suitable powder fluidity; the magnetic powder is filled in a mold cavity at a temperature below a softening point of the epoxy resin composition; the magnetic powder is compressed while a mold is heated to a temperature above the softening point; and the mold is cooled followed by releasing a molded magnetic member.

The above process allows the magnetic powder to be compressed as densely into the magnetic member as in the case wherein the epoxy resin composition which is in a liquid state at a room temperature. In addition, when a temperature of the whole mold is below the softening temperature of the epoxy resin composition during the filling step, uniform filling of the magnetic powder into the mold cavity is possible so that a green compact produced by compression while heating has improved handling properties. Thus, it is possible to ensure densely filling of the magnetic powder and also to keep good dimensional accuracy required for the magnetic member which is used for actual applications.

However, such a process requires to heat and then cool the whole mold relative to the softening point every molding cycle, and the mold has a heat capacity which is much larger than that of the bonded magnetic member. Such a large heat capacity increases periods required for heating and cooling. Thus, a cycle period for the molding (i.e. a total time for filling, compressing while heating, cooling and releasing steps) is considerably increased. Therefore, the process disclosed in Japanese Patent Kokai Publication No. 60-194,509 is not suitable for commercial production of the ring shaped resin bonded magnetic member in a large scale.

Japanese Patent Kokai Publication No. 63-194,312 discloses a process of producing an Fe—B—R based resin bonded magnetic member in which powder composite of magnetic flake-like powder (of which more than 50% by weight has a particle size above 75 μm) which is coated with an epoxy resin composition is filled into a mold cavity by means of its fluidity, the powder composite is compressed to obtain a green compact, the green compact is released from the cavity, and then the green compact is heated to cure.

The process allows a stably continuous operation and produces the magnetic member having an improved dimensional accuracy. However, in the process, the solid epoxy resin composition does not start sufficient plastic flow so as to increase a filling density of the magnetic powder even when the composite is compressed. Further, since many particles of the magnetic powder cohere in the mold, it is impossible to produce an anisotropic magnetic member with highly orientated.

DISCLOSURE OF THE INVENTION

It is an object of the present invention to provide a process of producing a ring shaped resin bonded magnet (or a ring shaped resin bonded magnetic member) in an industrial large scale which member having a good dimensional accuracy, a large density and a proper mechanical strength.

The other object will be clear from the following description.

There is provided a process of producing a ring shaped resin bonded magnet or magnetic member comprising the steps of:

(1) mixing magnetic powder, in particular Fe—B—R (wherein R is Nd and/or Pr) based magnetic powder, with a solution of an organic solvent which contains at least one heat curable resin composition which is in a solid state at a room (or a normal) temperature and which is capable of coating the powder so as to form a mixture of the magnetic powder and the solution;

(2) removing, in particular removing by evaporating, the organic solvent from the mixture formed in the step (1) (optionally followed by dissociating composite blocks made of cohering magnetic power with the resin composition which are formed by the removal of the organic solvent) so as to obtain the magnetic powder which is composite with the resin composition, and then classifying the magnetic powder so as to obtain a magnetic powder composite having a predetermined particle size range made of the magnetic powder and the resin composition (preferably which composite is substantially coated with a film of the resin composition);

(3) mixing the magnetic powder composite with at least one lubricant so as to obtain a feed mixture for molding made of the magnetic powder composite and the lubricant;

(4) filling an annular cavity of a mold with the feed mixture for molding by means of its powder fluidity;

(5) heating an inner peripheral surface of the annular cavity so as to transfer heat to the feed mixture through the inner peripheral surface, whereby heating the feed mixture to a temperature not lower than a softening temperature and below a curing temperature of the resin composition, and compressing the filled feed mixture after or during the heating;

(6) cooling the inner peripheral surface of the annular cavity so as to transfer heat from the heated and compressed feed mixture through the inner peripheral surface, whereby cooling the feed mixture to a temperature below the softening temperature of the resin composition (preferably to a room temperature) so as to obtain a green compact having a ring shape;

(7) releasing and taking out the green compact from the cavity, and (8) heating the green compact to a temperature not lower than the curing temperature of the resin composition.

By the above process, the ring shaped resin bonded magnetic member is produced in an industrial large scale which member has a high density, a sufficient mechanical strength and good dimensional accuracy even though the member has a thin wall (which means that a wall constituting the ring shape is thin, for example, a thickness of about 1 mm). It is noted that the term "ring" includes in addition to a usual ring shape, a hollow column shape having an annular cross section (i.e. cylinder) of which height is relatively small or very small (see FIG. 1).

In the above process, the steps (1) to (3) may be carried out separately beforehand so as to prepare the feed mixture (for the molding) of the lubricant and the magnetic powder composite which has the predetermined particle size range and which is made of the magnetic powder (for example Fe—B—R based magnetic powder) and the resin composition.

Therefore, the present invention provides a process of producing a ring shaped resin bonded magnet or magnetic member by molding a feed mixture for molding which contains a lubricant and a magnetic powder composite made of magnetic powder (such as Fe—B—R based magnetic powder) and a heat curable resin composition which is in a solid state at a room temperature, the magnetic powder composite having a predetermined particle size range, the process comprising the steps of:

(i) filling an annular cavity of a mold with the feed mixture for molding by means of its powder fluidity;

(ii) heating an inner peripheral surface of the annular cavity so as to transfer heat to the feed mixture through the inner peripheral surface, whereby heating the feed mixture to a temperature not lower than a softening temperature and below a curing temperature of the resin composition, and compressing the filled feed mixture after or during the heating;

(iii) cooling the inner peripheral surface of the annular cavity so as to transfer heat from the heated and compressed feed mixture through the inner peripheral surface, whereby cooling the feed mixture to a temperature below the softening temperature of the resin composition so as to obtain a green compact having a ring shape;

(iv) releasing and taking out the green compact from the cavity, and (v) heating the green compact to a temperature not lower than the curing temperature of the resin composition.

Further, the present invention provides a ring shaped resin bonded magnetic member which is produced by the above present process and which has a high density (for example, the density is more than 80% of a true density of the magnetic powder), a sufficient mechanical strength (for example, a radial crush strength is not less than 4 $kgf/mm^2$) and good dimensional accuracy.

In the present process, during the heating of the filled feed mixture (step (5) or (ii)), heat is transferred along a direction from a center toward an outer periphery of the annular cavity. On the other hand, during the cooling of the compressed feed mixture (step (6) or (iii)), heat is transferred along a direction which is opposite to the direction during the heating.

DETAILED DESCRIPTION OF THE INVENTION

Figure 1:
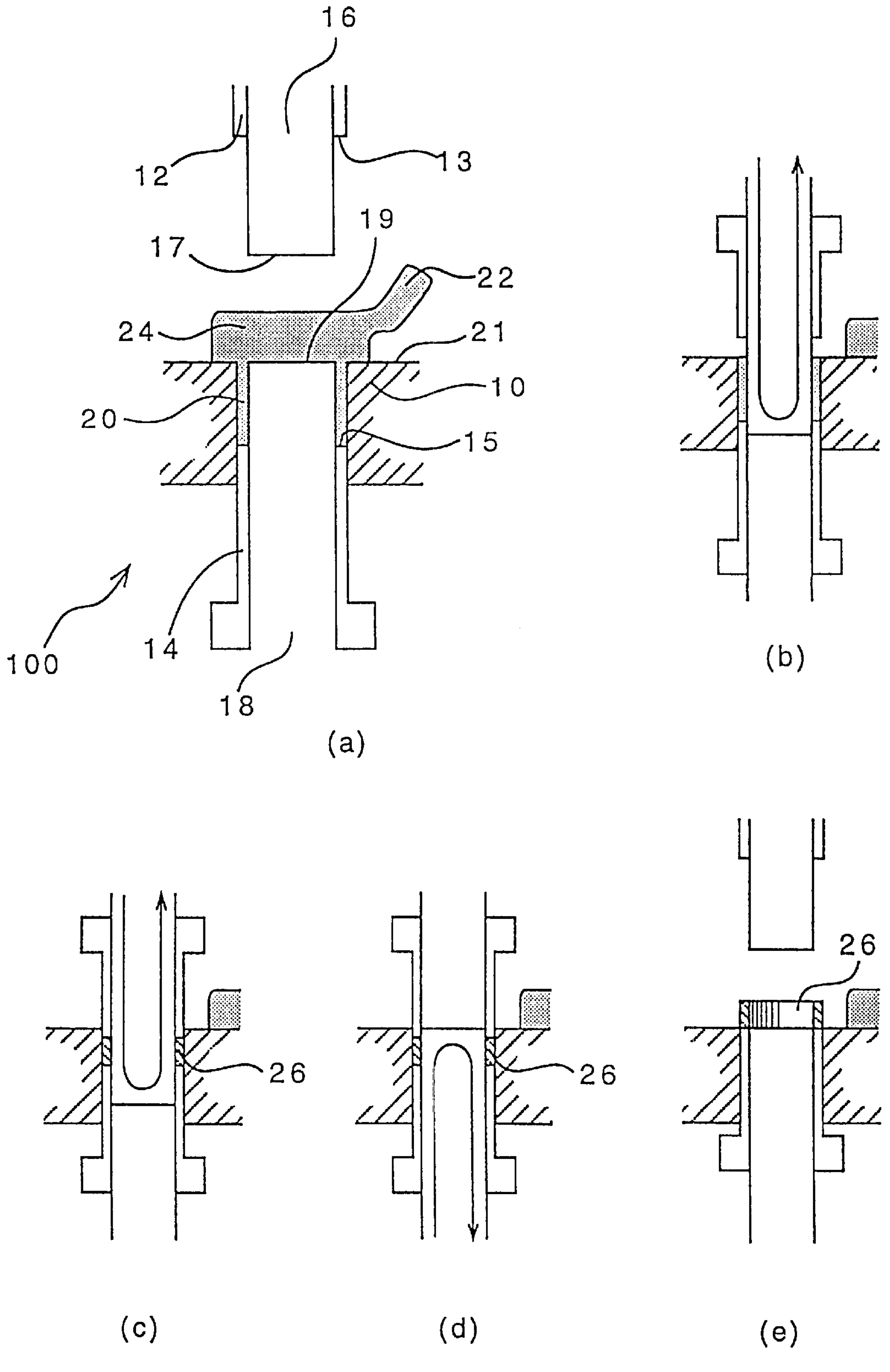
FIGS. 1 (*a*), (*b*), (*c*), (*d*) and (*e*) together schematically show a series of steps of the present process using cross sectional side views of a molding apparatus for a ring shaped member.

The magnetic powder which is used in the process according to the present invention is composed of extremely fine magnetic particles which may be in the form of a grain or a flake or any other available form. For the purpose of ease and convenience, these various particles are generally referred to as merely "particles." Particularly, preferable magnetic powder is Fe—B—R (wherein R is Nd and/or Pr) based magnetic powder. Fe may include Co, and thus Fe may be Fe(Co). The magnetic powder which is used in the process according to the present invention contains for example Nd (and/or Pr), Fe(Co) and B. More preferable magnetic powder contains Nd (and/or Pr), Fe(Co) and B at an atomic ratio of about 2:14:1. Such magnetic powder may be prepared by melt spinning (quenching) a molten alloy containing Nd (and/or Pr), Fe(Co) and B at an atomic ratio of about 2:14:1, and this powder comprises flake-like particles (i.e. melt spun powder).

The magnetic powder may be composed of magnetically isotropic flakes having a thickness of for example 20–30 $\mu$m which contains a hard magnetic phase of $Nd_2Fe(Co)_{14}B$ having a size of for example 20–300 nm, or may be magnetically isotropic powder having a magnetic phase of $Nd_2Fe(Co)_{14}B$. The magnetic powder may be magnetically isotropic powder which contains a plurality of magnetic phases of for example $\alpha$-Fe and/or $Fe_3B$ (soft magnetic phases) and $Nd_2Fe(Co)_{14}B$ (hard magnetic phase) and this powder may comprises flake-like particles. Further, the magnetic powder may be anisotropic powder having a magnetic phase of $Nd_2Fe(Co)_{14}B$. Those magnetic powders may be used alone or as a mixture of any combination thereof at any ratio.

The resin composition which is used in the process according to the present invention contains at least one resin which is in a solid state at a room temperature (for example at a temperature between 10 to 30° C.), and which preferably has an ability which is capable of forming film over magnetic powder surface, (preferably capable of coating substantially all the particles which constitute the magnetic powder), and finally capable of bonding the magnetic powder to form the ring shaped magnetic member. When the resin composition is made of more than one components, each component of the resin composition is in a solid state at a room temperature.

For example, an epoxy resin is preferably used as such a resin. The epoxy resin may be any conventional one which is usually used for the production of ring shaped resin bonded magnetic members. The epoxy resin may be a compound which contains at least two oxirane rings as expressed according to the following formula:

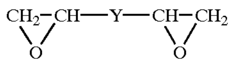

wherein Y is a residue having an alcoholic hydroxyl group(s) which residue is defined by excluding two epoxy end groups from a n epoxy resin molecule. Such a residue is for example a residue of a reaction product of epichlorohydrin and a polyphenol. Useful polyphenol includes resorcinol and various bisphenols which are formed by condensation of phenol and a ketone or an aldehyde.

Typical bisphenols include 2,2'-bis(p-hydroxylphenyl) propane (bisphenol A), 4,4'-dihydroxybiphenyl, 4,4'-dihydroxydiphenyl methane, and 2,2'-dihydroxydiphenyl oxide. Particularly, a compound such as a condensation product of bisphenol A and epichlorohydrin may be a preferable example of the epoxy resin which is used in the present invention. This compound contains at least one alcoholic hydroxyl group in its chain, it is in a solid state at a room temperature and it has the film forming ability.

The resin composition which is used in the process according to the present invention preferably contains, in addition to the above resin, a curing agent which cures (or polymerizes) such a resin. The curing agent is also in a solid state at a room temperature. As the curing agent for the epoxy resin, a blocked isocyanate is preferably used in the present invention. The blocked isocyanate is a species which is an adduct of for example an aromatic or aliphatic diisocyanate and an active hydrogen compound, and which dissociates at an elevated temperature to form a diisocyanate.

Examples of such a diisocyanate are hexamethylene diisocyanate, p-phenylene diisocyanate, m-phenylene diisocyanate, p, p'-diphenylmethane diisocyanate, p, p'-diphenyl ether diisocyanate and p, p'-biphenyl sulfon diisocyanate. Examples of the active hydrogen compound which forms the blocked isocyanate with the diisocyanate are an amine, an acid sulfite, a tertiary alcohol, c-caprolactam, a mercaptan, an enol and an oxime.

Each blocked isocyanate has its inherent dissociation temperature particularly depending on a kind of its active hydrogen compound. Generally, a blocked isocyanate is characterized in that it extremely hardly causes curing at a temperature below its dissociation temperature, while it rapidly cures the epoxy resin when it is heated to a temperature not lower than the dissociation temperature.

The resin composition which contains the epoxy resin and the curing agent as described above is dissolved into a proper organic solvent such as a ketone (for example, acetone) so as to prepare a solution of the resin composition, which is mixed with the magnetic powder for example at a room temperature (i.e. wet mixing). In order to accelerate the dissolution, the mixing may be carried out at an elevated temperature provided that the resin composition is not cured. The mixing may be carried out using a conventional means such as a kneader.

Then, the organic solvent is removed at a temperature condition at which the resin composition is not cured. Optionally, heating may be used so as to evaporate the solvent. Thereby, masses (or blocks) of the magnetic powder cohering with a weak force through the resin composition are left after the removal of the solvent. When heating is used, the masses are obtained after cooling. At this stage, the magnetic powder is coated with the resin composition due to its film formation ability. With a dissociating means such as a cutter mill, the masses are dissociated into fine particles of the magnetic powder composite. Depending on a manner for the removal for the solvent, no masses may be formed. For example, the evaporation of the solvent with stirring which prevents the magnetic powder from cohering may directly provide the fine particles. Those fine particles are classified based on their particle sizes so as to have magnetic powder composite of which particles are a predetermined particle size range. For example, sieving may be used for the classification. The magnetic powder composite thus obtained is inherently and substantially free-flowing.

The resin composition preferably contains at least one bisphenol type epoxy resin and at least one blocked isocyanate, amounts of which are suitably selected under the consideration of a density and performances and strength of the magnetic member to be produced. Generally, the magnetic powder composite contains the resin composition (e.g. the epoxy resin and the blocked isocyanate) at a concentration of 1.0–3.0%, and preferably about 2.5% by weight based on the magnetic powder composite. When the concentration of the resin composition is less than 1.0% by weight, the mechanical strength of the resulted magnetic member may be considerably reduced. On the other hand, when the concentration is greater than 3.0% by weight, high density of the magnetic member may be hardly achieved.

In a preferred embodiment of the present invention, the magnetic powder composite has the predetermined particle size which may be determined by a size of a sieve opening. For example, when a magnetic member having a wall thickness of not more than 1 mm, the composite preferably has such particle size that not less than 95% by weight of the composite has a particle size (which corresponds to a diameter of a grain when the powder is a grain form) in the range of 53–250 μm. Further, when an magnetic member having a wall thickness of not more than 0.5 mm, the composite preferably has such particle size that not less than 95% by weight of the composite has a particle size in the range of 53–150 μm. The classification to achieve a specific particle size may be carried out in any conventional manner such as sieving.

The specific particle size as described above relates to the magnetic powder composite (i.e. the magnetic powder which is composite with the resin composition). The reasons for the reference to the 95% by weight are as follows: since an amount of the particles which are not in the specific range is merely 5% by weight at most, and such an amount does not substantially affect on the properties of the final ring shaped magnetic member; and it is practically impossible to meet an requirement which is stricter than the 95% by weight requirement in an industrial production scale.

In the process according to the present invention, it is preferable to mix the magnetic powder composite together with the lubricant before starting the molding operation which improves fluidity of the composite, which allows in turn the composite to be filled uniformly in a molding cavity. Thus, prior to molding, mixing of the composite with the lubricant is carried out to prepare a feed mixture for the molding.

An amount of the lubricant is suitably selected under the consideration of the density and the performances and the strength of the magnetic member to be produced as in the selection of the amount of the resin composition. Generally, the lubricant is preferably used in an amount of 0.2–0.6% by weight of the magnetic powder composite (i.e. 0.2–0.6 parts by weight of the lubricant relative to 100 parts by weight of the composite). As the lubricant, any conventional one (such as a higher fatty acid or a metal soap thereof may be used. Examples of such a lubricant are preferably calcium stearate powder and magnesium stearate powder. The lubricant is in the form of very fine powder which has a small particle size in the order of submicron (i.e. less than 1 μm). When the amount of the lubricant to be used is less than 0.2% by weight, the powder fluidity of the feed mixture is unstable so that the dimensional accuracy of the final magnetic member may be adversely affected. On the other hand, when the amount is greater than 0.6% by weight, no further improvement of the fluidity may be achieved and the mechanical strength of the green compact may be reduced, which makes its handling properties poor.

The mixture of the magnetic powder composite and the lubricant as described above is formed in to an annular ring by molding. Pressure during the molding may be applied in any way. For example, a molding apparatus may be used which compresses mechanically or hydraulically. The apparatus carries out the steps of filling a mold cavity with the feed mixture of the magnet powder composite and the lubricant, compressing the mixture in the cavity, heating an inner surface of the mixture in the cavity to a temperature not less than softening point of the resin composition upon compressing, and after compressing and heating cooling, the inner surface of the mixture below the softening point of the resin composition so as to form a green compact. Optionally, the apparatus further carries out forming a magnetic field of which magnetic flux is directed radially and outwardly relative to the annular cavity during compressing while heating.

Thereafter, the green compact is removed from the cavity, and heated to a temperature not lower than the curing temperature of the resin composition. The softening temperature used herein is intended to mean the lowest softening temperature among softening temperatures of components which constitute the resin composition. Thus, heating the feed mixture, and thus the resin composition to a temperature not lower than the softening temperature thereof causes at least one component of the resin composition to soften and start its plastic flow. Preferably, heating is carried out so that substantially an entire of the resin composition is heated and thermally softened (in this case, at least a portion of the resin composition may be in a liquid state).

The molding operation of the process according to the present invention will be hereinafter explained with reference to FIG. 1 of the accompanying drawings, in which major members of a molding apparatus which may be used for carrying out the present process are schematically shown in cross-sectional views. FIG. 1 particularly intends to clarify positional relationships between the members of the apparatus.

The molding apparatus 100 shown in FIG. 1 comprises a molding die 10 having a cylindrical hole though the die 10, an upper punch 12 in the form of a cylinder and a lower punch 14 in the form of a cylinder both of which punches are adapted to be slid into the hole of the die 10. The upper punch 12 and the lower punch 14 have substantially the same circular sections, and a lower end surface 13 of the punch 12 and an upper end surface 15 of the punch 14 are adapted to abut to and register with each other when the both punches are located in the through hole of the die 10. Upon such abutment, the punches form a single cylindrical space inside the punches, into which space an upper core 16 (which can be heated) and a lower core 18 (which can be cooled) are adapted to be slid in contact with inner surfaces of the punches which together define the cylindrical space.

With respect to the cores, they have substantially the same circular sections, and a lower end surface 17 of the core 16 and an upper end surface 19 of the core 18 are adapted to abut to and register with each other when the both cores are located in the space. It is to be noted that a cavity 20 for molding the ring shaped magnetic member is an annular space defined between the die 10 and the core 16 and/or 18. Further, the end surfaces 13 and 15 of the upper punch 12 and the lower punch 14 define an upper end surface and a lower end surface of the cavity 20, respectively (see FIG. 1(*c*)). The members of the molding apparatus 100, that is, the punches 12 and 14 and the cores 16 and 18 are adapted to move upward and downward concentrically with and along an axis of the through hole of the die 10.

The upper core 16 is so constructed that the core, especially an outer surface thereof (which is in contact with the feed mixture when it is filled in the cavity 20) can be heated to a predetermined temperature. For such heating, any conventionally possible means may be used, and for example, a heating medium such as heated oil may be circulated through the core 16. Alternatively, an electric heater may be embedded in the core 16. Upon compressing, heat is transferred from the outer surface of the core 16 through the inner peripheral surface of the cavity into the feed mixture for the molding in the cavity 20 so that the mixture is heated to the softening temperature of the resin composition.

The lower core 18 is so constructed that the core, especially an outer surface thereof (which is in contact with the compressed feed mixture when it is in the cavity 20) can be cooled to a predetermined temperature. For such cooling, any conventionally possible means may be used. For example, a cooling medium may be circulated through the core 18. After the compression of the feed mixture, the upper core 16 is replaced with the lower core 18 and heat is transferred from the compressed mixture 26 in the cavity 20 through the inner peripheral surface of the cavity into the core 18 so that the compressed mixture is cooled to a predetermined temperature below the softening temperature of the resin composition so as to produce the green body 26.

[Filling of Feed Mixture for Molding]

The filling step will be explained below in which the feed mixture 24 which contains the magnetic powder composite and the lubricant is filled into the annular cavity 20 for molding.

As shown in FIG. 1(*a*), the members of the molding apparatus 100 are located. That is, the upper punch 12 and the upper core 16 are placed over and apart from the through hole of the die 10, the lower punch 14 is inserted into the through hole so that its upper end surface 15 is located at a predetermined level below an upper end of the through hole (namely, a top surface 21 of the die 10); the lower core 18 is so located that its upper end surface 19 is flushed with the upper end surface of the through hole (namely, the top surface 21 of the die 10); and thus the annular cavity 20 is formed using the lower core 18 which can cool the cavity, the die 10 and the lower punch 14.

Then, the feeder cup 22 is so moved that it is located over to the cavity 20 as shown in FIG. 1(*a*), and the cavity 20 is filled with the feed mixture 24 for molding made of the magnetic powder composite and the lubricant with aids of the fluidity (like free-flowing powder) of the mixture and the gravity. FIG. 1(*a*) schematically shows a condition just after the mixture 24 has been filled.

[Compression of Feed Mixture in Molding Cavity]

The compressing step will be explained below in which the feed mixture 24 is compressed in the annular cavity 20 while it is heated to a temperature not lower than the softening temperature (and below the curing temperature) of the resin composition by means of heat transfer through the inner peripheral surface of the cavity 20.

After the condition as shown in FIG. 1(*a*), the feeder cup 22 is moved backward and the upper core 16 is lowered such that its lower end surface 17 abuts the upper end surface 19 of the lower core 18. After the abutment, the upper core 16 is further lowered while keeping the abutment condition and accordingly the lower core 18 is also lowered. Such movement of the both cores may be carried out by supporting the lower core 18 on a spring member which is pressing the lower core 18 upward and by compressing the spring member with the lowering upper core 16.

When the lower end surface 17 of the upper core 16 is located below the lower end of the cavity 20 (i.e. the upper end surface 15 of the lower punch 15), the lowering of the upper core 16 is stopped. At this stage, the lower core 18 has been replaced with the upper core 16. Then, the upper core 16 is heated, and thereby heat is transferred from the core 16 through an outer surface of the core (thus the inner peripheral surface of the cavity 20) to the feed mixture 24 in the cavity 20. Such a condition is shown in FIG. 1(*b*), in which heating of the upper core 16 is shown with a U-shaped line with an arrow in the core 16 which indicates a heating medium flow.

Then, the upper punch 12 is lowered so that the feed mixture 24 in the annular cavity 20 is compressed with a predetermined pressure (for example, 8–10 t/cm$^2$) while heating is continued using the upper core 16, whereby the feed mixture is heated to a temperature not lower than the softening temperature of the resin composition. This compressing state while heating is schematically shown in FIG. 1(*c*). Also, the heating of the upper core 16 is shown with a U-shaped line with an arrow in FIG. 1(*c*) which indicates the heating medium flow.

At an initial stage of the compressing step, an apparent density of the feed mixture is still small (for example, about 2–3 g/cm$^3$), and heat transfer from the upper core 16 to the mixture through the inner peripheral surface of the cavity 20 is not necessarily sufficient, so that the temperature of the feed mixture is not considerably increased. However, as the compressing pressure is increased, the density of the mixture is increased and the heat transfer is accelerated, so that the mixture is finally heated to a temperature above the softening point of the resin composition. Since the magnetic member to be produced has a thin wall, a period required for the heating is short, and thus, a pressure retention period is also short. The compression period while heating may be usually less than 1 second, and preferably less than 0.5 seconds (for example 0.2 seconds).

Upon the compression, since the particles of the magnetic powder are brittle, they are densified while they are broken by the compression pressure. During such densification, the resin composition which has softened starts to plastically flow, which increases the filling density of the magnetic powder under for example the following effects:

1) that the plastic flow of the resin composition reduces friction between the magnetic powder and walls which define the annular cavity;
2) that the plastic flow of the resin composition reduces friction between the magnet powder particles which friction adversely affects on the densely filling of the magnetic powder; and
3) that the plastic flow of the resin composition wets surfaces of the magnetic powder particles which have been newly formed by the break of the magnetic powder.

When the concentration of the resin composition is 2–3% by weight in the magnetic powder composite and the compression pressure is 8–10 t/cm$^2$, a green compact is easily obtained which has a density not less than 80% of a true density of the magnet powder itself. As described above, the softening temperature of the resin composition means a softening temperature of a component which has the lowest softening temperature among all the components which constitute the resin composition.

[Cooling and Release from Cavity]

The step will be explained in which the feed mixture 26 which has been heated and compressed is cooled by heat transfer from the mixture 26 through the inner peripheral surface of the cavity to the lower core 18 so that the compressed mixture is cooled to a temperature below the softening point of the resin composition so as to obtain a green compact 26, and then the green compact 26 is released and removed from the cavity 20.

As shown in FIG. 1(*d*), the upper core 16 and the lower core 18 are moved upward relative to the die 10 while the abutment condition of the both punches is kept as shown in FIG. 1(*c*) such that the compressed feed mixture 26 is located around the lower core 18. Thus, the upper core 16 is replaced with the lower core 18. When the lower core 18 is supported on the spring member as described above, lifting the upper core 16 may allows the lower core 18 to move upward automatically. At this moment, the upper surface 19 of the lower core 18 is preferably flushed with the top surface 21 of the die 10.

Then, cooling of the mixture 26 is started using the lower core 18 so that the compressed mixture 26 is cooled to a temperature below the softening point of the resin composition. That is, the mixture is cooled by heat dissipation from the mixture through the inner peripheral surface of the cavity 20 to the lower core 16, whereby the green compact 26 is obtained which has improved mechanical strength and good dimensional accuracy. In FIG. 1(*d*), a U-shaped line with an arrow within the lower core 18 indicates a cooling medium flow.

Thereafter, as shown in FIG. 1(*e*), the lower punch 14 is moved upward relative to the die 10 so that the green compact 26 is moved onto the top surface 21 of the die 10 out of the cavity 20. After the removal of the green body 26 from the molding apparatus, the lower punch 14 is lowered to return its potion to that as shown in FIG. 1(*a*), and then the above procedures may be repeated to produce a next green compact.

Optionally, other member(s) rather than the upper core may be cooled during the cooling step so as to accelerate the heat dissipation. Further, when the magnetic powder is anisotropic, the compression step may be carried out while magnetic fluxes are formed using exiting coils and those fluxes are opposed to each other so that magnetic fluxes are oriented outward radially relative to the annular cavity, whereby the magnetic powder is oriented. In this case, demagnetizing is carried out after the compression so that a ring shaped (Fe—B—R based) green compact is produced with the anisotropic magnetic powder being oriented outward radially.

[Curing of Green Compact]

The green compact 26 thus obtained as above is heated to a temperature not lower than the curing temperature of the resin composition so as to allow the resin composition to cure (for example, not lower than a temperature at which the blocked isocyanate dissociates to form an isocyanate compound, which reacts with an epoxy group or an alcoholic hydroxyl group of the epoxy resin so that the epoxy resin is cured), whereby a final product of the ring shaped resin bonded magnetic member is produced together which is bonded by the resin composition through its film formation ability.

Thus, in a preferable embodiment, the present invention provides a process of producing a ring shaped resin bonded magnetic member, especially based on Fe—B—R magnetic powder, which process uses the resin composition which is capable of forming the film, which is in the solid state at a room temperature, and which contains the-blocked isocyanate and the epoxy resin at a concentration of 1–3% by weight based on the magnetic powder composite (i.e. the total weight of the magnetic resin and the resin composition), and also uses calcium stearate and/or magnesium stearate as the lubricant at an amount of 0.2–0.6% by weight of the magnetic powder composite, and comprises the steps of:

adjusting the particle size distribution of the magnetic powder composite so that more than 95% by weigh of the composite has a particle size within the range 53–150 μm or 53–250 μm depending on the thickness of the wall of the ring shaped magnetic member to be produced, and filling such adjusted composite together with the lubricant as the feed mixture into the molding cavity;

compressing the filled feed mixture while heating it to a temperature not lower than the softening temperature of the resin composition by heat transfer through the inner peripheral surface of the cavity to the feed mixture (during this step, the magnet powder may be magnetically oriented optionally);

cooling the compressed feed mixture to a temperature lower than the softening temperature of the resin composition by heat transfer from the compressed mixture through the inner peripheral surface of the cavity so as to obtain the green compact, which is released and removed from the cavity; and re-heating the green compact so as to cure the resin composition.

In such a present process, 1) the ring shaped bonded magnet is efficiently produced which has a high density and good dimensional accuracy even though its wall is thin;

2) a maximum energy product of not less than 10 MGOe is ensured when the magnetic member is based on Fe—B—R (wherein R is Nd and/or Pr) and has a density of not less than 80% of the true density of Fe—B—R based magnetic powder (i.e. 7.55 g/cm$^3$); and 3) Depending on demand, various magnetic powders having different magnetic properties may be used as the magnetic powder, for example magnetically isotropic magnetic flake-like powder or powder which includes $Nd_2Fe(Co)_{14}B$ magnetic phase, magnetically isotropic magnetic flake-like powder or powder which includes a plurality of magnetic phases such as $Nd_2Fe(Co)_{14}B$ magnetic phase as well as α-Fe and/or $Fe_3B$ magnetic phases, and magnetically anisotropic magnetic powder which includes $Nd_2Fe(Co)_{14}B$ magnetic phase.

Therefore, the magnetic member produced according to the present process is useful for various small or miniature motors which are required to consume less electric power or to generate larger output.

EXAMPLES

The present invention will be explained in a further detail with reference to the following examples, to which the present invention is not limited.

Example 1

Production of Fe—B—R Based Magnetic Powder Composite

A molten alloy having a composition of $Nd_{12.3}Pr_{0.2}Co_{5.5}B_{5.7}Fe_{bal.}$ in atomic percentage ("bal." means a balanced amount) was quenched to form magnetically isotropic flake-like magnetic powder (melt spun powder) which includes $Nd_2Fe(Co)_{14}B$ magnetic phase having a size of 20–50 nm. The flake had a thickness of 20–30 μm. The resulted powder was divided and classified to prepare Fe—B—R based magnetic powder having such a particle size that not less than 97% by weight of the powder has a particle size of 53–150 μm.

An acetone solution which contained 50% by weight of a resin composition based on the solution weight was prepared. The resin composition included an epoxy resin (average molecular weight: 1060, softening temperature: 75–85° C.) produced by condensation of epichlorohydrin and a bisphenol A and a blocked isocyanate (an adduct of p, p'-diphenylmethane diisocyanate and E-caprolactam).

The above acetone solution and the above magnetic powder were mixed and acetone was removed while heating the mixture to 60–80° C. followed by cooling so that masses of the magnetic powder cohering with the resin composition were formed. Those masses were dissociated to obtain magnetic powder composite, which was again classified to have such a particle size that not less than 97% by weight of the powder has a particle size of 53–150 μm. Thus obtained magnetic powder composite was filled in a molding cavity as described above and compressed at a room temperature (i.e. without heating by the upper core during the compression) at a pressure of 8–10 t/cm$^2$ so as to obtain a green compact, which was heated to cure, whereby a ring shaped resin bonded magnetic member was obtained.

The above production was carried out while an amount of the resin composition to be composite with the magnetic powder and a ratio of the blocked isocyanate to the bisphenol A (expressed as a ratio of the number of —N═C═O groups to the number of —OH groups, i.e. NCO/OH). Density and radial crush strength were measured for the resulted magnetic members (outer diameter: 43 mm, inner diameter: 41 mm, and height: 10 mm, thus the wall thickness: 1 mm) and the results of the measurements are shown in Tables 1 and 2 below. In Table 1, relative density (%) is also shown within brackets which is based on the true density (7.55 g/cm$^3$) of the magnetic powder.

TABLE 1

Density and Relative Density

| amount of resin composition (wt %) | density, g/cm$^3$ (relative density, %) NCO/OH = 0.6 | NCO/OH = 0.8 | NCO/OH = 1.0 | NCO/OH = 1.2 |
|---|---|---|---|---|
| 1.0 | 6.06(80.2%) | 6.03(79.8%) | 6.03(79.8%) | 6.09(80.6%) |
| 1.5 | 6.02(79.7%) | 6.00(79.4%) | 6.00(79.4%) | 6.07(80.3%) |
| 2.0 | 5.95(78.8%) | 5.92(78.4%) | 5.91(78.2%) | 5.98(79.2%) |
| 3.0 | 5.83(77.2%) | 5.77(76.4%) | 5.79(76.6%) | 5.80(76.8%) |

TABLE 2

Radial Crush Strength

| amount of resin composition (wt %) | radial crush strengths, kgf/mm$^2$ NCO/OH = 0.6 | NCO/OH = 0.8 | NCO/OH = 1.0 | NCO/OH = 1.2 |
|---|---|---|---|---|
| 1.0 | 2.42 | 3.01 | 3.01 | 3.11 |
| 1.5 | 4.73 | 4.57 | 4.55 | 4.46 |
| 2.0 | 6.10 | 5.40 | 5.65 | 5.30 |
| 3.0 | 6.36 | 6.31 | 6.28 | 5.43 |

It is seen from Table 1 that an amount of the resin composition greatly affects on the density of the magnetic member. On the other hand, at a fixed amount of the resin composition, increasing a ratio of the blocked isocyanate which is mechanically brittle increases the density of the magnetic member a little. In order to densify the magnetic powder to have a density not less than 80% of the true density of the magnetic powder, an amount of the resin composition should be not more than 2% by weight. However, when an amount of the resin composition is 1% by weight, the mechanical strength is poor, and particularly when an amount of the resin composition is less than 1% by weight, it is difficult to handle the green compact for the ring shaped magnetic member having a wall thickness of not more than 1 mm.

Example 2

Production of Feed Mixture for Molding made of Magnetic Powder Composite and Lubricant As in Example 1, after the removal of acetone by evaporation at 60–80° C. followed by being allowed to dry, magnetic powder composites were prepared having such various particle sizes that not less than 95% by weight of the powder had particle sizes of 53–150 μm, 53–250 μm, 53–350 μm and 53–500 μm, respectively.

Using the magnetic powder composites as prepared above, a feed mixture was prepared while a kind and an amount to be used of the lubricant was varied. Then, fluidity of the feed mixture was measured. Further, as in Example 1, the feed mixture was compression-molded at a room temperature to obtain a green compact, which was heated to cure (at 160° C. for 20 minutes), whereby a ring shaped magnetic member was produced. The resulted magnetic member was subjected to the measurement of the radial crush strength. It is noted that the fluidity means a period (sec) required for the mixture (50 g) to pass through a given opening.

Figure 2:
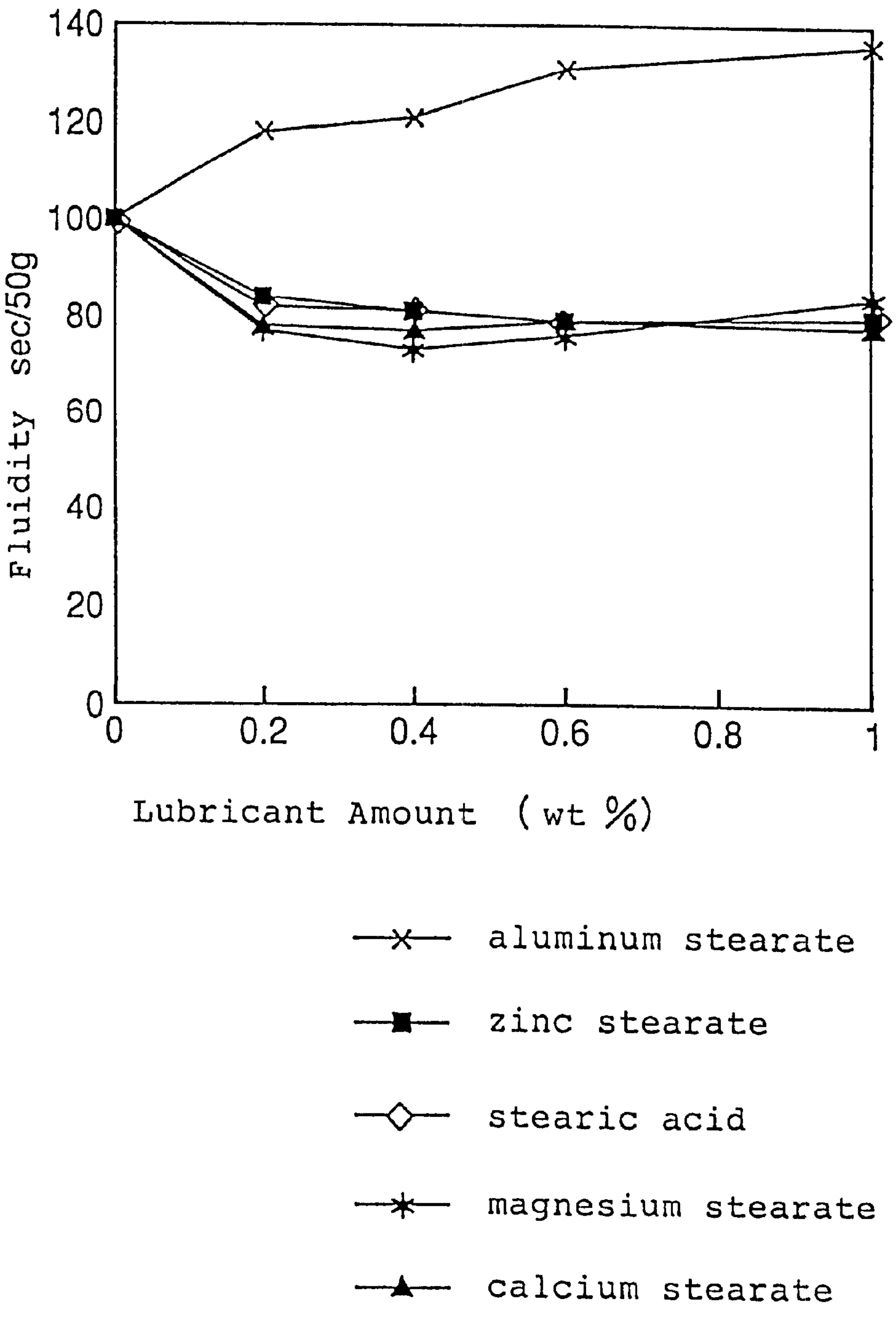
FIGS. 2 is a graph which shows relationships between an amount of a lubricant and fluidity of a feed mixture.
Figure 3:
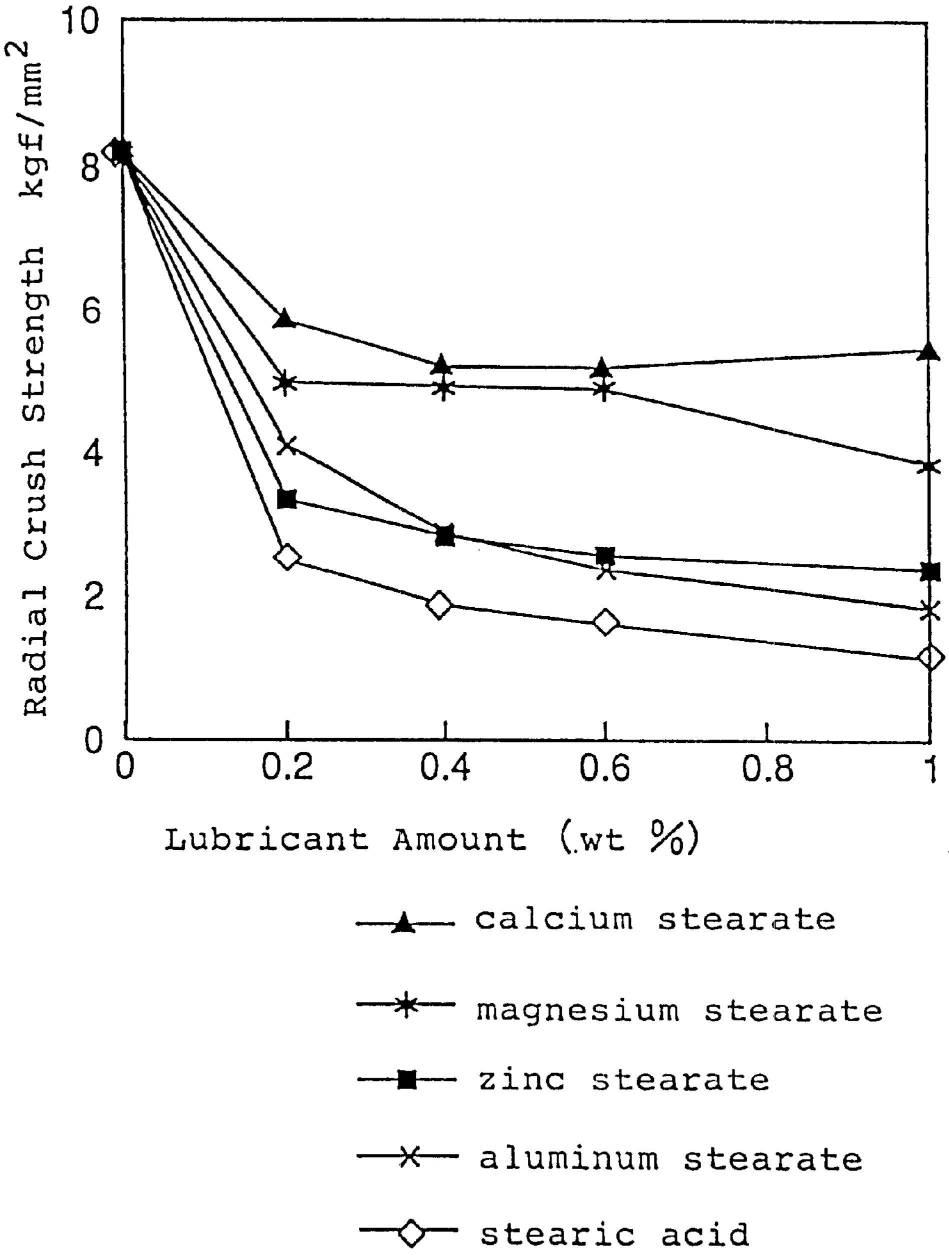
FIG. 3 is a graph which shows relationships between an amount of a lubricant and radial crush strength of a magnetic member.

The results of the above two measurement are shown in FIGS. 2 and 3, respectively. FIG. 2 is a graph which shows effects of an amount and the kind of the lubricant on the fluidity of the feed mixture while FIG. 3 shows the effect on the strength.

It is seen from FIGS. 2 and 3 that calcium stearate powder and magnesium stearate powder have preferable fluidity and that their use causes less effect on the radial crush strength of the Fe—B—R based ring shaped bonded magnetic member even though an amount of them to be used is varied, when compared with the other lubricants. Thus, it is preferable to use stearate powder and/or magnesium stearate powder as the lubricant.

When the fluidity of the feed mixture is not sufficient as in the case wherein the amount of the used lubricant is less than 0.2% by weight, no uniform filling of the feed mixture may be achieved, so that the dimensional accuracy of the resulted green compact is degraded. On the other hand, when the amount of the used lubricant is more than 0.6% by weight, no further improvement in the dimensional accuracy can be expected, but handling properties of the green compact are degraded because of less mechanical strength.

The magnetic powder composites each having different particle size as described above were used so as to produce the ring shaped magnetic member. The member had an outer diameter of 43 mm and a height of 2 mm. As the lubricant, calcium stearate was used at 0.4 parts by weight based on the magnetic powder composite. For the produced magnetic members, a degree of parallelization was measured. The results are shown in Table 3 below.

TABLE 3

Degree of Parallelization vs Particle Size

| wall thickness mm | degree of parallelization, mm 150–53 μm | 250–53 μm | 350–53 μm | 500–53 μm |
|---|---|---|---|---|
| 1.6 | 0.010 | 0.012 | 0.011 | 0.035 |
| 1.0 | 0.012 | 0.012 | 0.068 | 0.112 |
| 0.5 | 0.009 | 0.011 | 0.105 | — |

It is seen from Table 3 that for the improvement in the uniform filling of the feed mixture into the annular cavity and also in the dimensional accuracy, the particle size of more than 95% by weight of the magnetic powder composite is preferably in 53–250 μm for the production of the ring shaped magnetic member having a wall thickness not larger than about 1 mm, and in 53–150 μm for the a wall thickness not larger than about 0.5 mm, and that calcium stearate and/or magnesium stearate is preferably used at a ratio not smaller than 0.2 parts by weight.

Example 3

Production of Ring Shaped Bonded Magnetic Member Based on Fe—B—R

As in Example 1, a feed mixture was prepared which contains the magnetic powder composite having such a particle size that more than 95% by weight of the composite has a particle size of 53–250 μm as well as calcium stearate (0.4% by weight) as the lubricant. The feed mixture was charged in the feeder cup, and molded into a green compact as described above with reference to FIG. 1. The lower core was cooled using a cooling medium at a temperature of 15° C. and the upper core was heated using a heating medium at a temperature of 90° C. The compression pressure was 8–10 t/cm$^2$.

The resulted green compact was heated to a temperature above the thermally dissociating temperature of the blocked isocyanate (140° C.) so that a dissociated isocyanate group crosslinked with an epoxy group or an alcoholic hydroxyl group of the epoxy resin, whereby the resin composition was cured so as to form a ring shaped resin bonded magnetic member having an outer diameter of 43 mm, an inner diameter of 41 mm and a height of 10 mm.

As in Example 1, the effects of an amount (wt %)of the resin composition and also a ratio of the blocked isocyanate to the epoxy resin on the density and the radial crush strength were observed for the resulted magnetic members. The results are shown in Tables 4 and 5 below. Table 4 shows the density and the relative density (%) within brackets which is based on the true density (7.55 g/cm$^3$) of the magnetic powder. Table 5 shows the radial crush strength.

TABLE 4

Density and Relative Density

| amount of resin | density, g/cm$^3$ (relative density, %) | | | |
|---|---|---|---|---|
| composition (wt %) | NCO/ OH = 0.6 | NCO/ OH = 0.8 | NCO/ OH = 1.0 | NCO/ OH = 1.2 |
| 1.0 | 6.32(83.7%) | 6.28(83.1%) | 6.23(83.7%) | 6.34(83.9%) |
| 1.5 | 6.27(83.0%) | 6.26(82.9%) | 6.30(83.4%) | 6.32(83.7%) |
| 2.0 | 6.22(82.3%) | 6.23(82.5%) | 6.19(81.9%) | 6.25(82.7%) |
| 3.0 | 6.08(80.5%) | 6.05(80.1%) | 6.04(80.0%) | 6.05(80.1%) |

TABLE 5

Radial Crush Strength

| amount of resin | radial crush strengths. kgf/mm$^2$ | | | |
|---|---|---|---|---|
| composition (wt %) | NCO/ OH = 0.6 | NCO/ OH = 0.8 | NCO/ OH = 1.0 | NCO/ OH = 1.2 |
| 1.0 | 3.89 | 4.54 | 4.24 | 4.01 |
| 1.5 | 6.13 | 5.97 | 5.91 | 5.79 |

TABLE 5-continued

Radial Crush Strength

| amount of resin | radial crush strengths. kgf/mm$^2$ | | | |
|---|---|---|---|---|
| composition (wt %) | NCO/ OH = 0.6 | NCO/ OH = 0.8 | NCO/ OH = 1.0 | NCO/ OH = 1.2 |
| 2.0 | 6.75 | 6.40 | 6.65 | 6.30 |
| 3.0 | 6.67 | 6.63 | 6.58 | 6.43 |

It is seen from Table 4 that the process according to the present invention easily produces the ring shaped magnetic member based on Fe—B—R having a density of not smaller than 80% of the true density of the magnetic powder itself. Also, it is seen from Table 5 that the mechanical strength is improved by 5–40% relative to the results shown in Table 2 by compression while heating (namely, warm compression). This is partly because the resin composition is softened and melted during the warm compression so that the particles of the magnetic powder is wetted by the resin composition.

The ring shaped magnetic members produced in Example 3 had a roundness (or circularity) in the range of 0.013–0.022 mm, and a concentricity of 0.08–0.022 mm, and those values are substantially not different from those for the magnetic member which are produced by cold compression molding (i.e. with compression at a room temperature). It is noted that the roundness, the concentricity and the degree of parallelization were all measured according to JIS-B-0621 and JIS-B-0022 (relating to geometric nominal error). Thus, the process according to the present invention ensures the good dimensional accuracy of the magnetic member since the feed mixture having good fluidity is uniformly filled into the cavity which has been cooled to a temperature below the softening point of the resin composition, followed by the warm compression and the subsequent cooling, whereby producing the well-densified green compact.

If necessary, other member(s) rather than the lower core may be cooled. Further, when the magnet powder is magnetically anisotropic, densification with the warm compression may be carried out while generating, by means of exciting coils, magnetic fluxes along the upper core and the lower core which fluxes are so converged that they are opposing, whereby the magnetic powder is oriented radially outward relative to the annular cavity, so that the green compact is obtained in which magnetic powder is radially oriented, which finally results in the magnetic member including more highly oriented magnetic powder.

Figure 4:
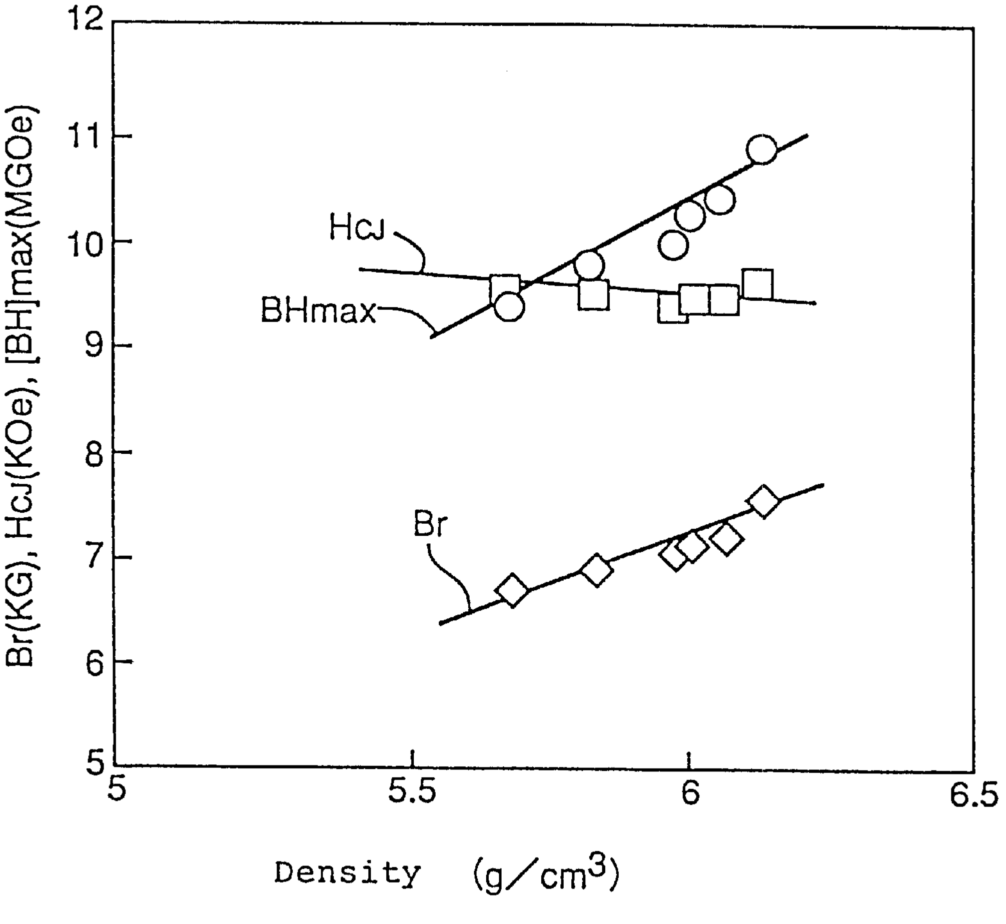
FIG. 4 is a graph which shows relationships between some magnetic properties and a density of a bonded magnet.

FIG. 4 is a graph which shows relationships between the density of the Fe—B—R based magnet and a maximum energy product (BH)max, specific coercive force Hci and residual flux density Br. The graph has been established by data measured using a VSM (vibrating sample magnetometer) for a column magnetic member which had a diameter of 5 mm and a height of 5 mm which was pulse-magnetized with 50 kOe along its height direction. As seen from the graph, the maximum energy product (BH) max, the specific coercive force Hci and the residual flux density Br all relate to the density.

The process according to the present invention can produce the magnetic member having a density above 80% of the true density of the magnetic powder which is 7.55 g/cm$^3$. Thus, the magnetic member according to the present invention is estimated to have a density above 6.04 g/cm$^3$ which corresponds to the maximum energy product (BH)max of more than 10 MGOe based on FIG. 4.

Example 4

Figure 5:
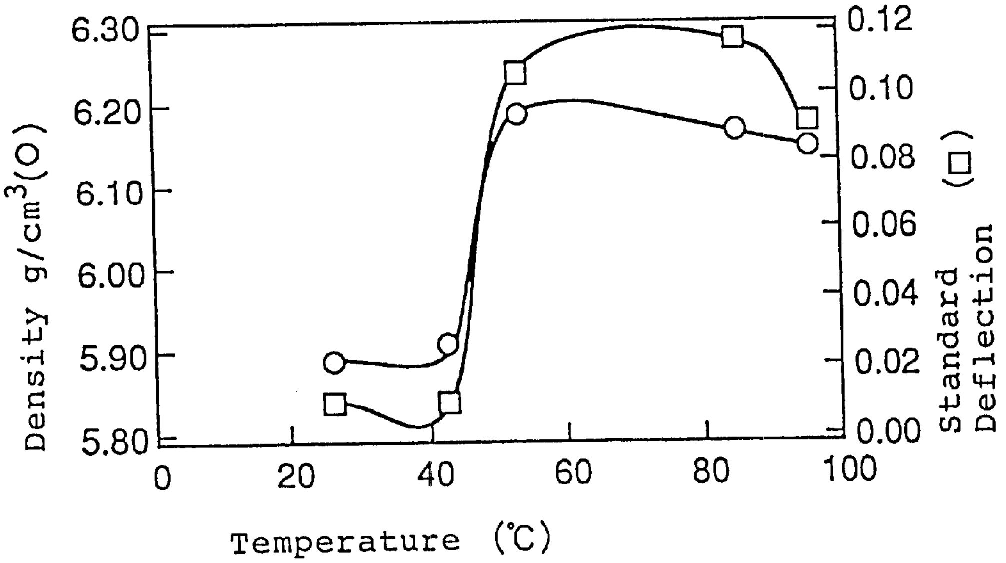
FIG. 5 is a graph which shows an effect of a heating temperature during compression on a density of a magnetic member.

Varying the heating temperature during the compression molding, the density of the resulted magnetic member was measured. The results are shown in FIG. 5. As seen from FIG. 5, when the heating temperature during the molding is set to above 40° C. and preferably above 50° C., the resulted magnetic member has the large density.

What is claimed is:

1. A ring shaped resin bonded magnetic member which has a relative density of not smaller than 80% and which is produced by a process comprising the steps of:

(i) filling an annular cavity of a mold with a feed mixture which comprises a lubricant and a magnetic powder composite comprised of magnetic powder and a heat curable resin composition which is in a solid state at room temperature, the magnetic powder composite having a predetermined particle size range;

(ii) heating only an inner peripheral surface of the annular cavity so as to transfer heat to the feed mixture through the inner peripheral surface, thereby heating the feed mixture to a temperature not lower than a softening temperature and below a curing temperature of the resin composition, and compressing the feed mixture after or during the heating, to obtain a heated and compressed feed mixture;

(iii) cooling only the inner peripheral surface of the annular cavity so as to transfer heat from the heated and compressed feed mixture through the inner peripheral surface, thereby cooling the feed mixture to a temperature below the softening temperature of the resin composition so as to obtain a green compact having a ring shape;

(iv) releasing and taking out the green compact from the annular cavity; and (v) heating the green compact to a temperature not lower than the curing temperature of the resin composition, to thereby form the ring shaped resin bonded magnetic member which has a relative density of not smaller than 80%.

2. The ring shaped resin bonded magnetic member according to claim 1, wherein the feed mixture to be filled in the annular cavity is prepared by the steps of:

(1) mixing magnetic powder with a solution of an organic solvent which contains the heat curable resin composition which is in a solid state at room temperature and which coats the powder so as to form a mixture of the magnetic powder and the solution;

(2) removing the organic solvent from the mixture formed in the step (1) so as to obtain the magnetic powder which is mixed with the resin composition, and then classifying the magnetic powder so as to obtain the magnetic powder composite having the predetermined particle size range made of the magnetic powder and the resin composition; and (3) mixing the magnetic powder composite with at least one lubricant so as to obtain the feed mixture.

3. The ring shaped resin bonded magnetic member according to claim 1, wherein the magnetic powder is Fe—B—R based magnetic powder, wherein R is Nd and/or Pr.

4. The ring shaped resin bonded magnetic member according to claim 3, wherein the magnetic powder is comprised of magnetically isotropic particles which are prepared by melt spinning of an alloy of Nd, Fe(Co) and B and which contains a hard magnetic phase of $Nd_2Fe(Co)_4B$.

5. The ring shaped resin bonded magnetic member according to claim 3, wherein the magnetic powder is comprised of particles prepared by melt spinning of an alloy of Nd, Fe(Co) and B and which contains at least a hard $Nd_2Fe(Co)_{14}B$ magnetic phase and soft α-Fe and/or $Fe_3B$ magnetic phases.

6. The ring shaped resin bonded magnetic member according to claim 3, wherein the magnetic powder is magnetically anisotropic powder which contains a hard magnetic phase of $Nd_2Fe(Co)_{14}B$.

7. The ring shaped resin bonded magnetic member according to claim 1, wherein the resin composition is present in an amount of 1.0 to 3.0% by weight of the magnetic powder composite.

8. The ring shaped resin bonded magnetic member according to claim 1, wherein the resin composition comprises at least one bisphenol A epoxy resin and at least one blocked isocyanate which are solid at room temperature.

9. The ring shaped resin bonded magnetic member according to claim 1, wherein the feed mixture is prepared by mixing, with the magnetic powder composite, the lubricant of 0.2 to 0.6% by weight based on the magnetic powder composite.

10. The ring shaped resin bonded magnetic member according to claim 1, wherein the lubricant is calcium stearate and/or magnesium stearate.

11. The ring shaped resin bonded magnetic member according to claim 1, wherein the ring shaped magnetic member has a wall thickness of not more than 1 mm and more than 95% by weight of the magnetic powder composite has a particle size in the range of 53–150 μm.

12. The ring shaped resin bonded magnetic member according to claim 1, wherein the ring shaped magnetic member has a wall thickness of not more than 0.5 mm and more than 95% by weight of the magnetic powder composite has a particle size in the range of 53–150 μm.

13. The ring shaped resin bonded magnetic member according to claim 1, wherein the inner peripheral surface of the annular cavity is heated using a molding apparatus which comprises an upper core which is capable of heating and which defines the inner peripheral surface of the annular cavity in the step (ii).

14. The ring shaped resin bonded magnetic member according to claim 13, wherein the molding apparatus is further capable of forming a magnetic field of which flux is oriented radially outward relative to the annular cavity just before or during the step (ii).

15. The ring shaped resin bonded magnetic member according to claim 13, wherein the molding apparatus for powder further comprises a lower core which is capable of cooling and which defines the inner peripheral surface of the annular cavity in the step (iii).

* * * * *

UNITED STATES PATENT AND TRADEMARK OFFICE

CERTIFICATE OF CORRECTION

PATENT NO. : 6,602,569 B2 
DATED : August 5, 2003
INVENTOR(S) : Fumitoshi Yamashita et al.

It is certified that error appears in the above-identified patent and that said Letters Patent is hereby corrected as shown below:

Column 18,
Line 6, change "$Nd_2Fe(Co)_4B$" to -- $Nd_2Fe(Co)_{14}B$ --.
Line 38, change "53-150 $\mu$m" to -- 53-250 $\mu$m --.

Signed and Sealed this

Twenty-third Day of March, 2004

JON W. DUDAS
*Acting Director of the United States Patent and Trademark Office*